(12) United States Patent
Lewis

(10) Patent No.: US 7,035,412 B2
(45) Date of Patent: Apr. 25, 2006

(54) WLAN ERROR CONTROL

(75) Inventor: Michael Lewis, Marsta (SE)

(73) Assignee: Infineon Technologies AG, Munich (DE)

( * ) Notice: Subject to any disclaimer, the term of this patent is extended or adjusted under 35 U.S.C. 154(b) by 458 days.

(21) Appl. No.: 10/612,657

(22) Filed: Jul. 2, 2003

(65) Prior Publication Data

US 2004/0128589 A1 Jul. 1, 2004

Related U.S. Application Data

(60) Provisional application No. 60/394,096, filed on Jul. 3, 2002.

(51) Int. Cl.
*H04L 9/20* (2006.01)

(52) U.S. Cl. .................... 380/268; 380/273; 380/274; 714/752

(58) Field of Classification Search ............... 380/268, 380/273–274; 714/752, 781; H04L 9/20
See application file for complete search history.

(56) References Cited

U.S. PATENT DOCUMENTS

| | | | | |
|---|---|---|---|---|
| 3,439,279 A | * | 4/1969 | Gustav ...................... 380/268 |
| 5,710,815 A | | 1/1998 | Ming et al. .................. 380/20 |
| 6,493,842 B1 | * | 12/2002 | Kondo et al. ............... 714/752 |
| 6,848,051 B1 | * | 1/2005 | Wachtfogel et al. ......... 713/181 |

FOREIGN PATENT DOCUMENTS

JP  2005151056 A  *  6/2005

OTHER PUBLICATIONS

Schmidl, T.; "Re: PRoposal for Data Scrambling Method"; In IEEE Standards Working Group.

* cited by examiner

*Primary Examiner*—R. Stephen Dildine
(74) *Attorney, Agent, or Firm*—Baker Botts L.L.P.

(57) ABSTRACT

A method in a wireless communications network is disclosed whereby errors due to incorrect transmission of scrambler seed values can be very greatly reduced. This is achieved by using a known pseudo-random seed generating algorithm at both at least one transmitting device 1 that has an associated transmitting address and at least one receiving device 2 that has at least one associated receiving address, it is possible to reduce errors due to incorrectly transmitted scrambler seed values.

15 Claims, 9 Drawing Sheets

| MAC header | Frame body | FCS |
|---|---|---|
| 32 | N | 4 |

Figure 2a

| MAC header | Frame body ||||||||| FCS |
|---|---|---|---|---|---|---|---|---|---|---|
| | FEC | DATA | FEC | DATA | FEC | DATA | FEC | DAT | *FCS* FEC | |
| 32 | 16 | 208 | 16 | 208 | 16 | 208 | 16 | 4-208 | 16 | 4 |

Figure 2b

WLAN ERROR CONTROL

PRIORITY

This application is a conversion of and claims priority to commonly owned U.S. provisional patent application Ser. No. 60/394,096, filed Jul. 3, 2002, entitled "WLAN Error Control," by Michael Lewis, which is incorporated herein by reference in their entirety for all purposes.

TECHNICAL FIELD

The present invention relates to data transmission protocols in general and specifically to reduction of error propagation due to scrambler seed value transmission errors in such data transmission protocols where an error control code is added to the message at a high level in the protocol, while scrambling of the message prior to transmission is performed at a lower level in the protocol, and the seed used to initiate the scrambler is appended to the scrambled message prior to transmission.

BACKGROUND OF THE INVENTION

Data communication systems are frequently described in terms of a "protocol stack", which groups the sequences of tasks required to operate the system into logically related groups known as "layers". Conceptually, higher layers have a higher level of abstraction; e.g. the user applications are at the highest layer while the circuits responsible for transmitting the data e.g. over the air or over a copper wire are at the lowest layer.

An example of this is the 802.11 wireless LAN (WLAN) standard, as represented in simplified form in FIG. 1. The 802.11 protocol stack is divided into the MAC (medium access control) layer and PHY (physical) layer. When transmitting, the MAC layer takes messages from the layer above, appends addressing and error-checking information, checks that the wireless medium is free, and passes the expanded message to the PHY layer. The PHY layer formats the data for transmission, adds PHY-specific information (e.g. a preamble and transmission rate information), modulates the data and transmits it onto the antenna. At the receiver, the PHY layer receives the transmitted data, using the PHY-specific information, and passes the MAC-level message to the MAC layer. Here, the received message is checked for errors, and if the message is addressed to the device in question the data is passed up to the higher layer.

One of the benefits of this logical organization into separate layers is that functions specific to an individual layer can be added or enhanced while retaining compatibility with other layers in the system, and different physical layers can be implemented. For instance, the original 802.11 WLAN standard defines PHY layers operating over radio or infrared links, while the 802.11a enhancement to the 802.11 standard offers a higher rate of data transmission (up to 54 Mbp/s) over a radio link. At the MAC layer, the 802.11e draft standard offers a number of enhancements to the basic 802.11 MAC protocol to support better throughput, better scheduling data delivery and enhanced protection against transmission errors.

While the separation into protocol layers has great benefits in terms of logical structure and extensibility, certain disadvantages and problems can occur due to interactions between functions in different layers. An example of this occurs when 802.11e MAC level forward error control is applied over a link using the 802.11a high-rate PHY.

The conventional 802.11 MAC layer prepends a 32-octet MAC header to the message sequence, containing addressing and control information, and appends a 4-octet "frame check sequence" to the message which is a 32-bit cyclic redundancy check value that can be used to detect almost all possible errors in the transmitted data. This structure is outlined in FIGS. 2a and 2b.

The forward error control (FEC) system used in the 802.11e draft standard is based on Reed Solomon coding, breaking the transmitted message into blocks of 208 or fewer octets to each of which a 16 octet error control code is appended. This is done in such a way that the resulting frame appears as a conventional 802.11 MAC frame to non-802.11e aware devices: all FEC information is contained within the frame body, and the MAC header and FCS are prepended and appended as for standard 802.11, allowing interpretation of address information and checking for correct transmission. Within the frame body, a 16-octet FEC field is added to protect the MAC header, while the data is split into blocks of 208 octets protected by a 16-octet FEC field. A frame check sequence calculated over the MAC header and message is appended to the final block of data. This inner "FEC FCS" can be used for final confirmation that error correction was successfully able to correct for errors introduced in transmission. The code used is capable of correcting up to 8 octets in each block of 224 data and FEC octets, and thereby offers reasonably strong protection against transmission errors.

The 802.11a high-rate PHY layer offers data rates of up to 54 Mbps operating in the 5 GRz radio band. The 802.11 g draft PHY standard uses an essentially identical modulation format in the 2.4 GHz radio band, and so the issues discussed here apply to the majority of new IEEE 802.11 WLAN equipment when trying to benefit from MAC-level FEC.

The 802.11a PHY layer takes the MAC-layer frame, and performs scrambling on the data in order to make the characteristics of the transmitted modulated sequence independent of the message being transmitted. The scrambler circuit specified in the 802.11a standard is shown in FIG. 3 and is made up of a linear feedback shift register (LFSR) whose output is XOR:ed with the incoming data. The sequence generated is uniquely defined by the initial state of the delay elements D1–D7, which is known as the seed value for the scrambler. The standard defines that this seed value should be set to a pseudo-random non-zero state for each message transmitted.

At the receiver, the same seed value must be loaded into the delay elements. The same sequence can then be generated at the receiver and XOR:ed with the incoming data stream, thereby recovering the original data. For this to be possible, a sequence of 7 zero bits is prepended to the message (followed by 9 bits whose use is reserved for future supplements to the standard). The whole prepended 16-bit field is called the service field. Since the original data is known to be zero for the initial 7 bits, it is possible to deduce the initial state of the scrambler from the transmitted sequence.

Clearly, correct function of the design is dependent on successfully receiving these 7 bits so as to be able to initialize the scrambler correctly. If the scrambler is incorrectly initialized, the entire subsequent message will be corrupted since the wrong sequence will be generated. When the original 802.11a standard was formulated, there was no error correction proposed in the MAC layer, so this propagation of errors was unimportant: any error would mean that the message would be discarded. However, when trying to implement MAC-level error correction, this error propagation severely limits the level of error correction that is possible at medium to high signal to noise ratios. Fundamentally, the probability that a frame must be discarded becomes dominated by the probability of having one or more bit errors in the 7-bit scrambler initialization sequence rather than the probability of having an error in the data that cannot be corrected.

These differences are shown graphically in FIG. 4, where the unbroken line shows the probability of more than 8 octet errors occurring in a given block of 224 (i.e. the probability of an FEC failure) for a given underlying bit error rate, on the assumption that bit errors are independent of one another. The dashed line shows the probability of one or more errors occurring in the scrambler initialization field (the probability of a scrambler failure). It is clear that at underlying bit error rates higher than approximately $10^{-2.7}$, the chance of the FEC failing (more than 8 octet errors in any given 224 octet FEC block) is greater than the chance of an error in the 7 bits of the scrambler error. However, when the underlying bit error rate decreases, the theoretical resulting packet error rate with FEC should rapidly become very small, but this does not happen due to the error propagation problem with the descrambler.

In typical applications where MAC level forward error correction is desired, such as distribution of audio and video data streams, the tolerable bit error rate is generally low. The difference between the theoretical performance from the FEC system and the limit caused by scrambler error propagation means that more transmit power or lower range must be accepted to maintain a given level of performance in these cases.

In order to be valid within the scope of the 802.11e MAC layer draft standard, any solution to the problem must be fully compatible with other devices that implement the 802.11a PHY standard. It is also desirable that the 802.11 MAC header and FCS field can be interpreted by a non-802.11e aware device, which is a property maintained in the current 802.11 e FEC MAC frame structure.

One known solution is to calculate error control bits on the scrambler initialization bits (e.g. adding 4 bits by using a [11,7] Hamming code), with the bits transmitted in the reserved section of the PHY service field.

A second solution is to transmit the service field (scrambler initialization data) at a lower data rate that is less susceptible to errors, while switching to a higher data rate for the message part of the packet.

There are however some problems associated with the above described solutions.

The first solution requires the use of bits specified as reserved in the 802.11a PHY layer standard, and thereby requires a change to the standard.

The second solution also requires a change to the 802.11a PHY layer standard, since it is not currently supported to transmit the service field at a different transmission speed.

Thus there is a need for a method for reducing or limiting the transmission errors due to incorrectly transmitted seed values that is valid within the present standard.

SUMMARY OF THE INVENTION

The problems described above can be greatly mitigated by using an agreed scrambler seed-generating algorithm in both the transmitter and receiver. Since transmitted messages may be corrupted or lost, it must be possible to synchronize the seed generating process in the receiver with that in the transmitter. This requirement can be met by using an algorithm where the next value from the seed generating algorithm is uniquely determined by the current value (e.g. by using a 7 bit LFSR pseudo-random sequence generator with a primitive generator polynomial) and/or from the contents of the message, and then allowing the current value to be determined from correctly received packets. This method of seed generating is fully compliant with the 802.11a standard.

The invention is a method and an arrangement in a wireless communications network or system whereby errors due to incorrect transmission of scrambler seed values can be very greatly reduced. This method requires no changes to either the 802.11a PHY layer standard or the 802.11e FEC MAC frame structure as it is described here. By using a known pseudo-random seed generating algorithm at both sender and receiver, it is possible to eliminate scrambler seed transmission errors between a single sender/receiver transmission pair except in the case where two consecutive frames are received incorrectly. The method is extended to cover the case where a number of different transmitters can communicate with a single receiver, and examples of an implementation of the method in an 802.11e access point and terminal adapter are given.

A method for limiting error propagation due to scrambler seed value transmission errors in a wireless communication network the method may comprise the steps of providing state information at a transmitting device for each message transmitted from the transmitting device, providing state information at a receiving device for each received message, and attempting to retrieve state information by the transmitting device regarding a receiving address associated with the receiving device. If no state information is retrievable by the transmitting device such state information is generated by an arbitrary method in order to generate a new seed value for a message to be transmitted. If state information is retrievable by the transmitting device, this information is utilized to initialize a first seed-generating algorithm in order to generate a new seed value for the message to be transmitted, and is updated by the algorithm. Further steps include applying a scrambling algorithm initialized by the new seed value to the message to be transmitted, thereby creating a scrambled message, transmitting the scrambled message from the transmitting device, receiving and descrambling the scrambled message at the receiving device, based on the seed value deduced from the received message, and checking the received descrambled message for errors that are not corrected by a forward error correction code.

The method may further comprise the steps of using received messages that are free from errors to synchronize a second seed-generating algorithm in the receiving device with the first seed-generating algorithm in the transmitting device, and using a current local seed value in the receiving device to attempt to correct errors in the descrambled message caused by an incorrect received seed.

Another method for limiting error propagation due to scrambler seed value transmission errors in a wireless communication network comprising at least one transmitting device 1 and at least one receiving device 2, wherein each transmitting device 1 has an associated transmitting address and each receiving device 2 has at least one associated receiving address, wherein each transmitting device 1 applies a forward error correction code to transmitted messages followed by scrambling of the message, and the scrambling is generated from a seed value, and each transmitted message is structured in such a manner that the seed value can be inferred at a receiving device 2 in the case of an error-free received message, comprises the steps of:

providing state information at the transmitting device 1 for each message transmitted from the transmitting device 1 in such a manner that the transmitting device 1 can generate a sequence of seed values associated with each receiving address, providing state information at the receiving device 2 for each received message in such a manner that the receiving device 2 can generate sequences of seed values, each sequence associated with a unique combination of a transmitting address and a receiving address, the transmitting device 1 attempting to retrieve state information regarding a receiving address associated with the receiving device 2, if no state information is retrievable by the transmitting device 1 such state information is generated by an arbitrary method in order to generate a new seed value for a message to be transmitted, if state information is retrievable by the transmitting device 1, this information is utilized to initialize a first seed-generating algorithm in order to generate a new seed value for the message to be transmitted, and is updated by the algorithm, applying a scrambling algorithm initialized by the new seed value to the message to be transmitted, thereby creating a scrambled message, transmitting the scrambled message from the transmitting device 1, receiving and descrambling the scrambled message at the receiving device 2, based on the seed value deduced from the received message, checking the received descrambled message for errors that are not corrected by the forward error correction code, using received messages that are free from errors to synchronize a second seed-generating algorithm in the receiving device 2 with the first seed-generating algorithm in the transmitting device 1, using a current local seed value in the receiving device 2 to attempt to correct errors in the descrambled message caused by an incorrect received seed.

The disclosed methods may further provide that the receiving device 2 performing a search of some or all of the current local seed values of each seed sequence at the receiving device 2 and uses each such seed value from the search in an attempt to correctly receive the message. The current local seed value in the receiving device 2 may be used to synchronize the second seed-generating algorithm in the receiving device 2 with the first seed-generating algorithm in the transmitting device 1, if the message is free from errors following the attempt to correct errors in the descrambled message caused by an incorrect received seed. The first seed-generating algorithm at the transmitting device 1 may generate the same sequence of seed value as the second seed-generating algorithm at the receiving device 2, when correctly synchronized. The methods may further comprise the step of determining the next seed value in the sequence of seed values at the transmitting device 1 from at least the current seed value. The methods may further comprise the step of causing the first seed-generating algorithm at the transmitting device 1 to move to the next seed value in the sequence of seed values at the transmitting device 1 and update the state information for the receiving address for each transmitted message. The methods may further comprise the step of causing the second seed-generating algorithm at the receiving device 2 to move to the next seed value in the sequence of seed values at the receiving device 2 and update the state information for the transmitting and receiving addresses for each correctly received message.

The main advantage of the invention is that it greatly mitigates the problems due to scrambler seed value transmission with MAC level forward error correction, while not requiring changes to the PHY layer and maintaining compatibility with devices equipped with legacy 802.11 MACs. The likely complexity of the seed value search is significantly lower for mobile terminals than it is for access points, a desirable property since mobile terminals have tighter power and cost constraints than access points. The number of seed values in the search is limited to the number of devices transmitting using MAC-level FEC times the total number of receiver addresses used, rather than the total number of transmitters in the system.

A secondary advantage, compared with solutions that require precoding/postcoding of the data, is that implementation of this method and the scale to which it is implemented can be made optional. Also, there is a wide degree of tradeoff possible between complexity and performance with this approach.

BRIEF DESCRIPTION OF THE DRAWINGS

The invention will be described more in detail below with reference to the appended drawing in which:

FIGS. 2a and 2b shows 802.11 and 802.11e FEC MAC frame formats.

DESCRIPTION OF THE INVENTION

Figure 1:
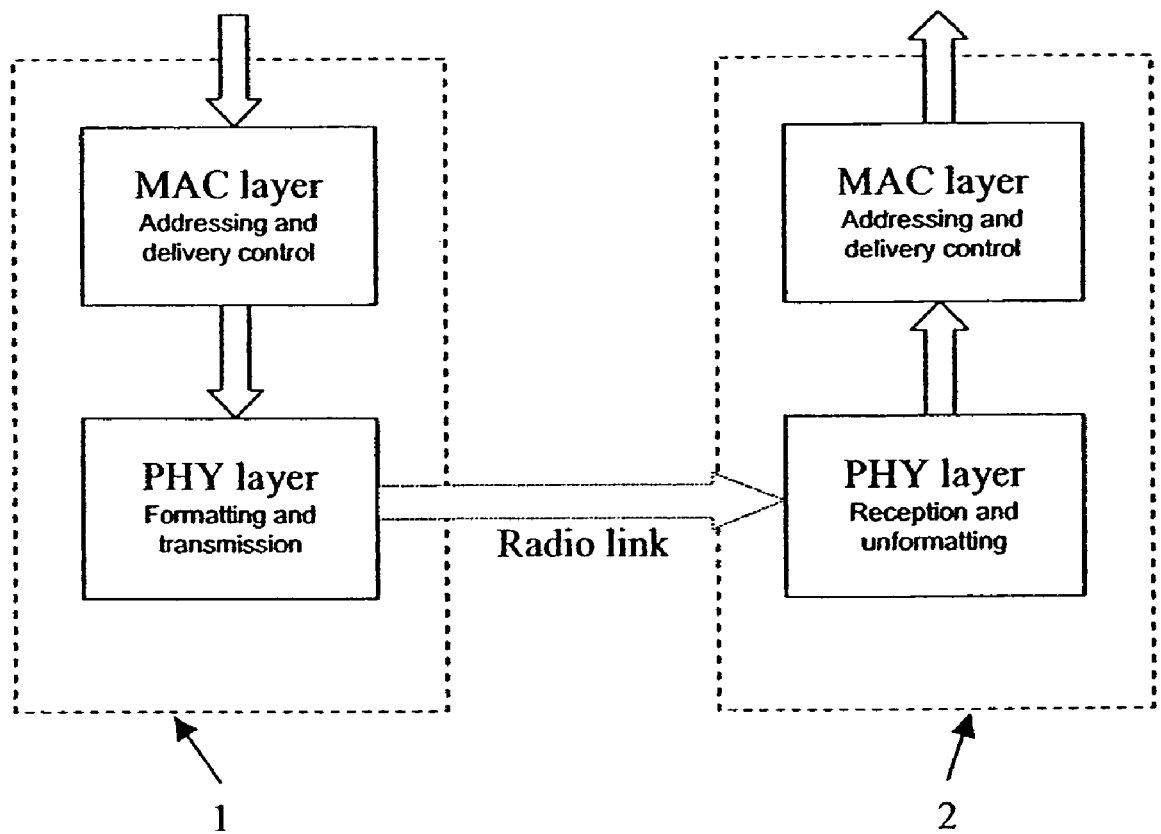
FIG. 1 shows a schematic example of an 802.11 WLAN protocol stack.
Figure 3:
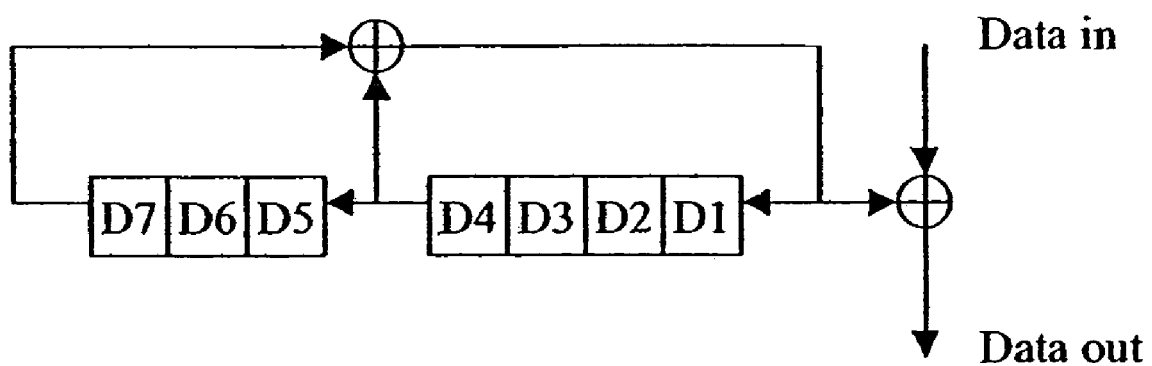
FIG. 3 shows a schematic 802.11a PHY scrambler.
Figure 4:
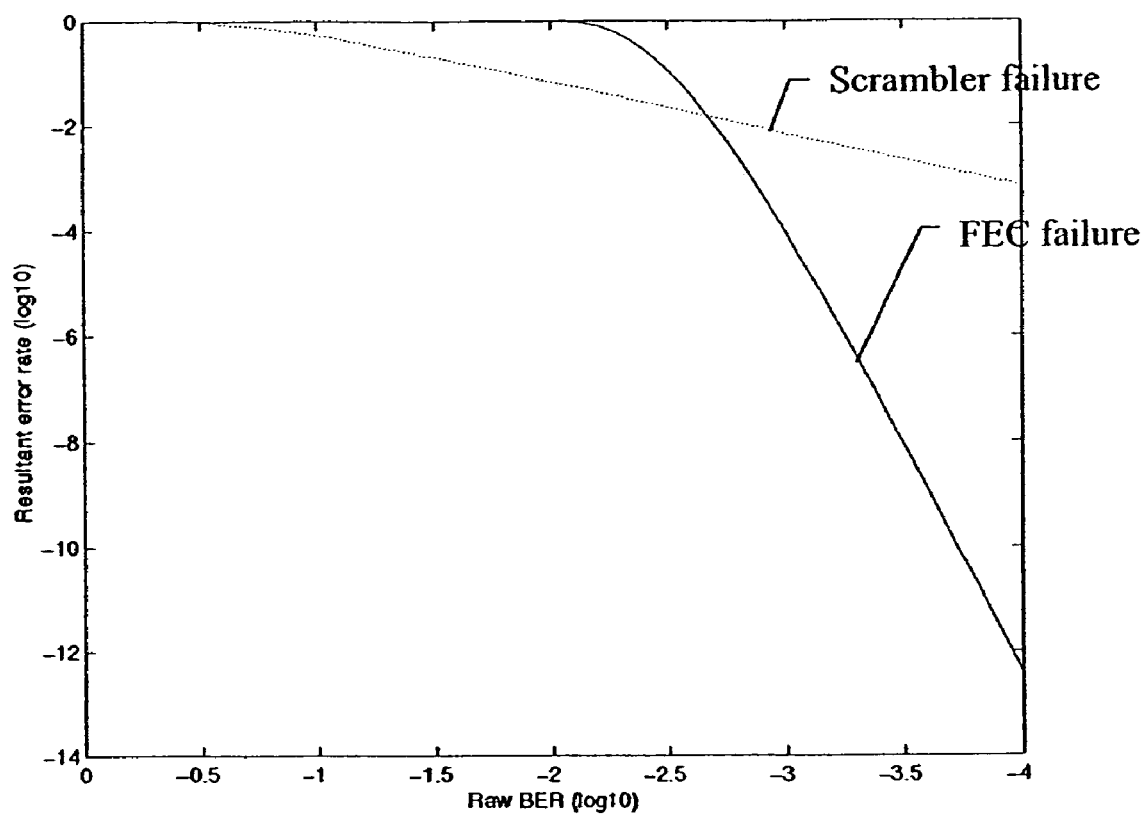
FIG. 4 shows the probabilities of packet error due to scrambler failure and FEC failure.
Figure 5:
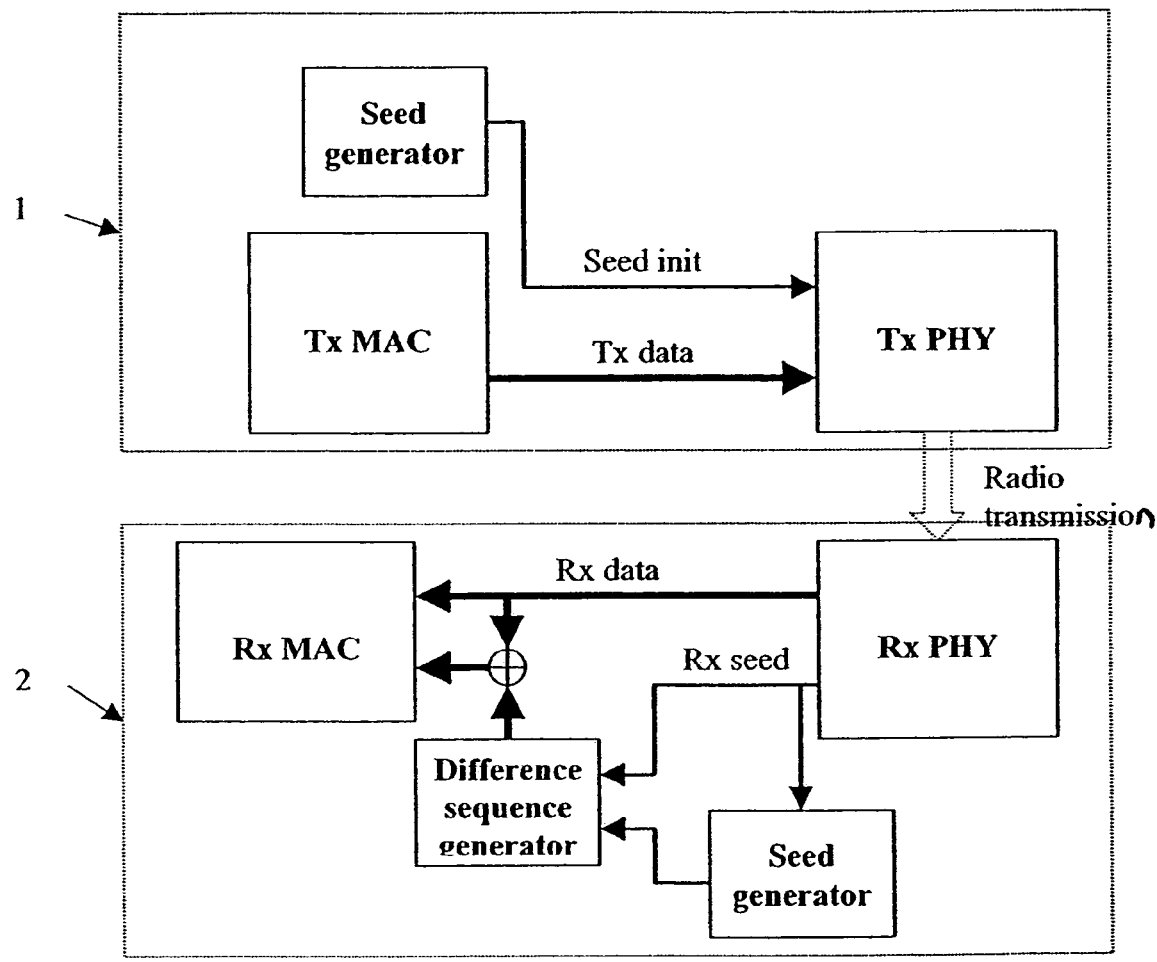
FIG. 5 shows a schematic architecture of an embodiment of a communication link between a single transmitting device and a single receiving device according to the invention.
Figure 6:
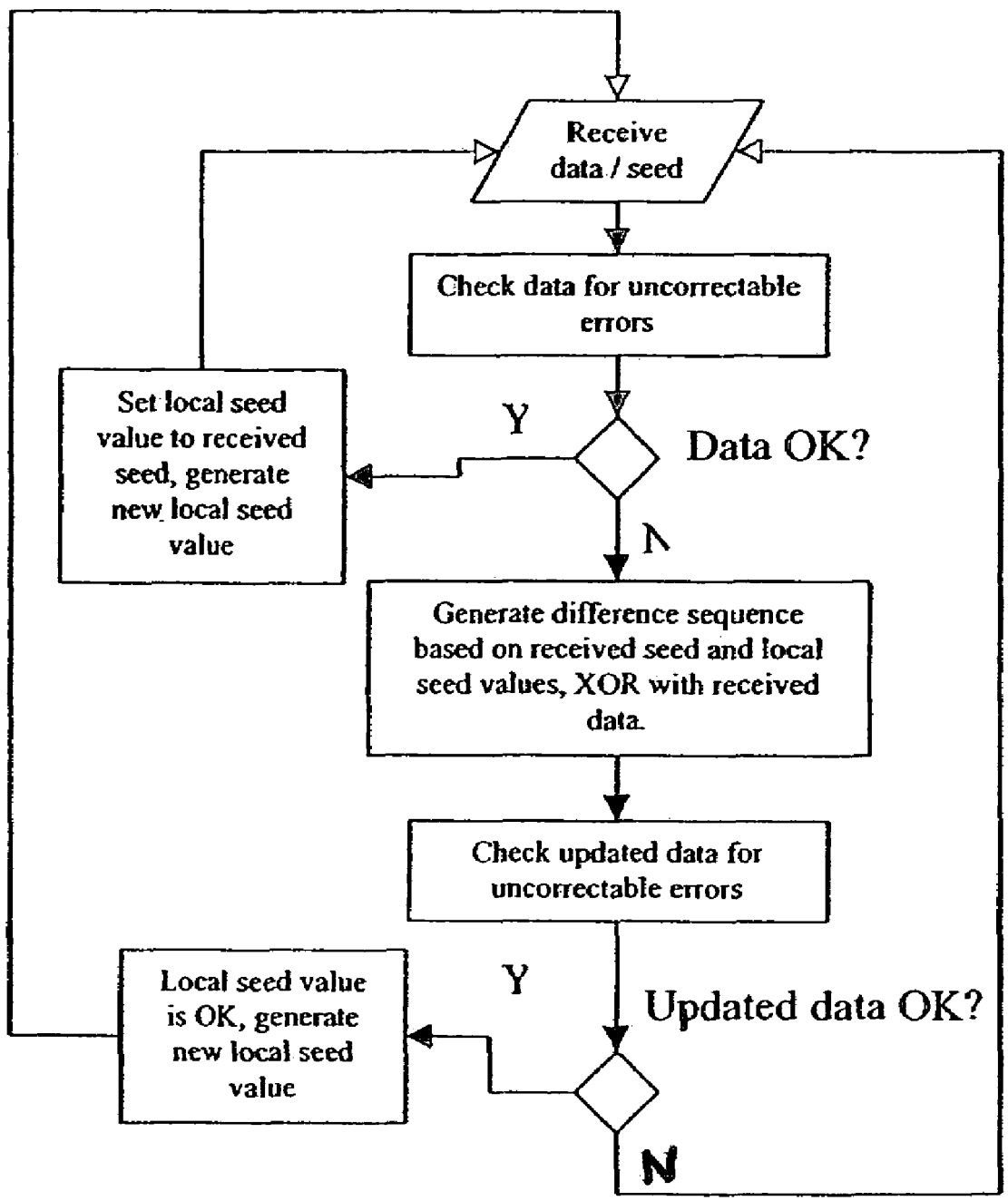
FIG. 6 shows a schematic flow diagram of a method in a communication link according to the invention.

One possible embodiment in which to implement the invention is shown in FIG. 5. This embodiment relates to the case of a communication link with one single transmitting device 1 and one single receiving device 2. At the transmitting device 1, a new scrambler seed value is produced by a seed generator for each new message sent on Tx data, and this seed value is used to initialize the scrambler seed value in the PHY layer of the transmitting device 1. At the receiving device 2, the message is received on Rx data, and Rx seed is set to the value of the scrambler seed deduced within the receiver PHY. The algorithm performed within the Rx MAC layer of the receiving device 2 then proceeds according to the schematic flow diagram in FIG. 6.

The first step of the method according to the invention is to check the received data for uncorrectable errors, i.e. errors that are not corrected by the FEC. One way of doing this is to use the so called outer FCS value to check for initial errors, attempt to correct any errors using the Reed-Solomon FEC information, and to check whether any errors remain by using the inner FEC FCS value.

If there were no errors, or the errors could be corrected, the received seed value can be treated as correct. The local seed value at the receiving device 2 can then be set to the received seed value, and the next local seed value in the sequence at the receiving device 2 can be generated.

If there were uncorrectable errors, then these errors were either caused by an error in the received seed value and/or were caused by random transmission errors overloading the error correcting capability of the Reed-Solomon code (meaning that the packet cannot be recovered regardless of whether the scrambler seed value is correct or not).

In an attempt to recover from an error in the Rx seed, the receiving device 2 assumes that the currently held local scrambler seed value is correctly synchronized with the transmitting device 1. The difference between the scrambling sequence generated from Rx seed and the scrambling sequence generated by the local seed value is created, and is XOR:ed with the data sequence. Assuming that the local seed value is correct, this generates an updated sequence which is corrected for the errors introduced by the error in Rx seed.

The MAC layer of the receiving device 2 can then check whether this updated data value is free of uncorrectable errors, e.g. by the same method as was used to check the original received data. If the result is free from errors the local seed value can be treated as correct and the next local seed value in the sequence of seed values can be generated at the receiving device 2.

If the result of this second stage is incorrect, then either the message was corrupted by random transmission errors, or the local seed value is out of synchronization with the transmitting device 1 (which can only happen if no messages have been received from the transmitting device 1, or the immediately preceding message from the transmitting device 1 was lost or corrupted).

This system can be modeled in terms of a 2-state Markov chain process, since the probability of an error in a given message is dependent only on whether the previous message was in error (and thereby has caused the local scrambler seed value at the receiver to be invalid). This analysis shows that the proposed method gives a performance that has a negligible difference to the ideal performance of the FEC system without the scrambler propagation error.

Figure 7:
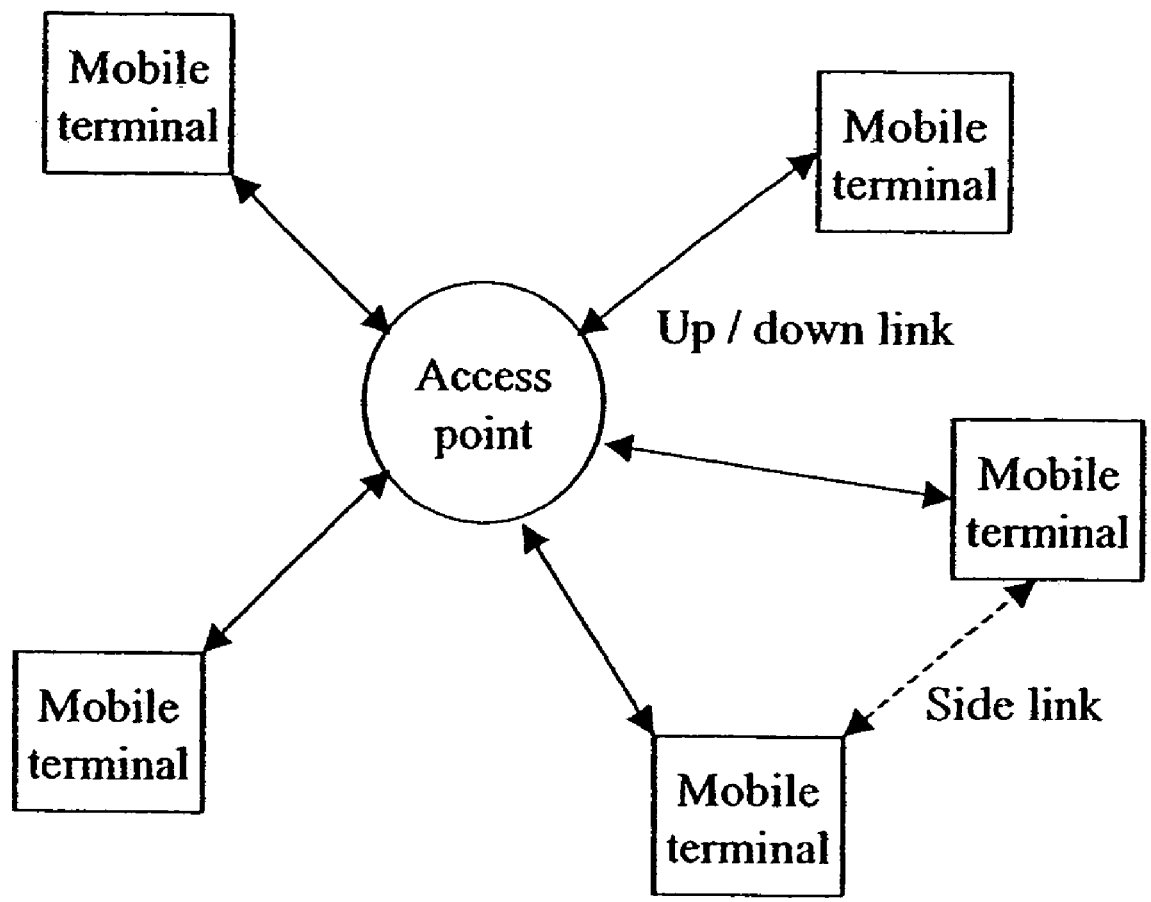
FIG. 7 shows an example of an 802.11 WLAN cell (BSS)

In many practical communication systems or networks, a receiving device 2 must deal with the possibility of transmissions from more than one transmitting device 1. Also, a transmitting device 1 must deal with the possibility of transmitting to several receiving devices 2 and/or several receiving addresses associated with each receiving device 2. A typical example of this is an 802.11 WLAN system, as pictured in FIG. 7. In a WLAN cell (known as a basic service set or BSS) a number of mobile terminals maintain contact with a central access point or AP, and all traffic is sent from or received by the access point, which acts as a router for messages from one mobile terminal to another. The 802.11e draft proposes to extend this by allowing sidelinks, where a mobile terminal can request permission from the access point to set up communications directly to another mobile terminal.

In this more general case, it is necessary to maintain a synchronized seed-generating algorithm with each terminal with which communication is occurring.

This is possible if, at the transmitting device 1, a separate seed-generating process is associated with each receiving address to which data is sent, and, at each receiving device 2 and for each receiving address associated with that receiving device 2, a separate seed-generating process is associated with each transmitting address. A difficulty that must be overcome at the receiving device 2 is that the transmitting address may not be known until the message (including the header information) has been correctly received. In this case, it is necessary to search through the available local seed values at the receiving device 2 until one is found which allows the message to be correctly descrambled, or the search is exhausted.

Figure 8:
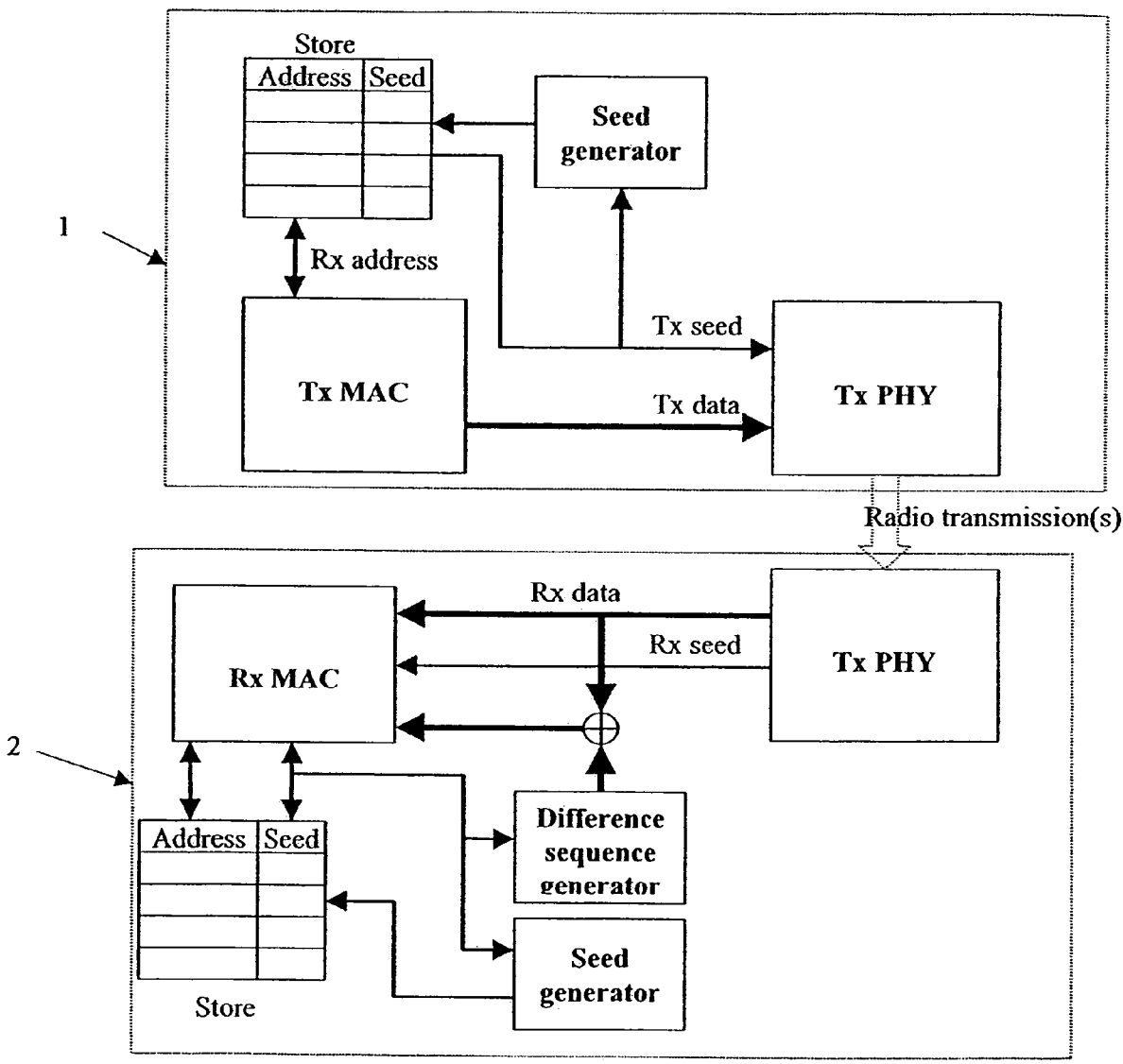
FIG. 8 shows a schematic architecture of an embodiment of a communications system according to the invention.

One other possible embodiment in which to implement the invention is shown in FIG. 8. This embodiment relates to a wireless communication system comprising at least one transmitting device 1 that has an associated transmitting address and at least one receiving device 2 that has at least one associated receiving address.

At the transmitting device 1 so called state information is provided or stored for each transmitted message in such a manner that the transmitting device 1 can generate a sequence of seed values associated with each receiving address. Also, at the receiving device 2 state information is provided for each received message in such a manner that the receiving device 2 can generate sequences of seed values, where each such sequence is associated with a unique combination of a transmitting address and a receiving address.

Figure 9:
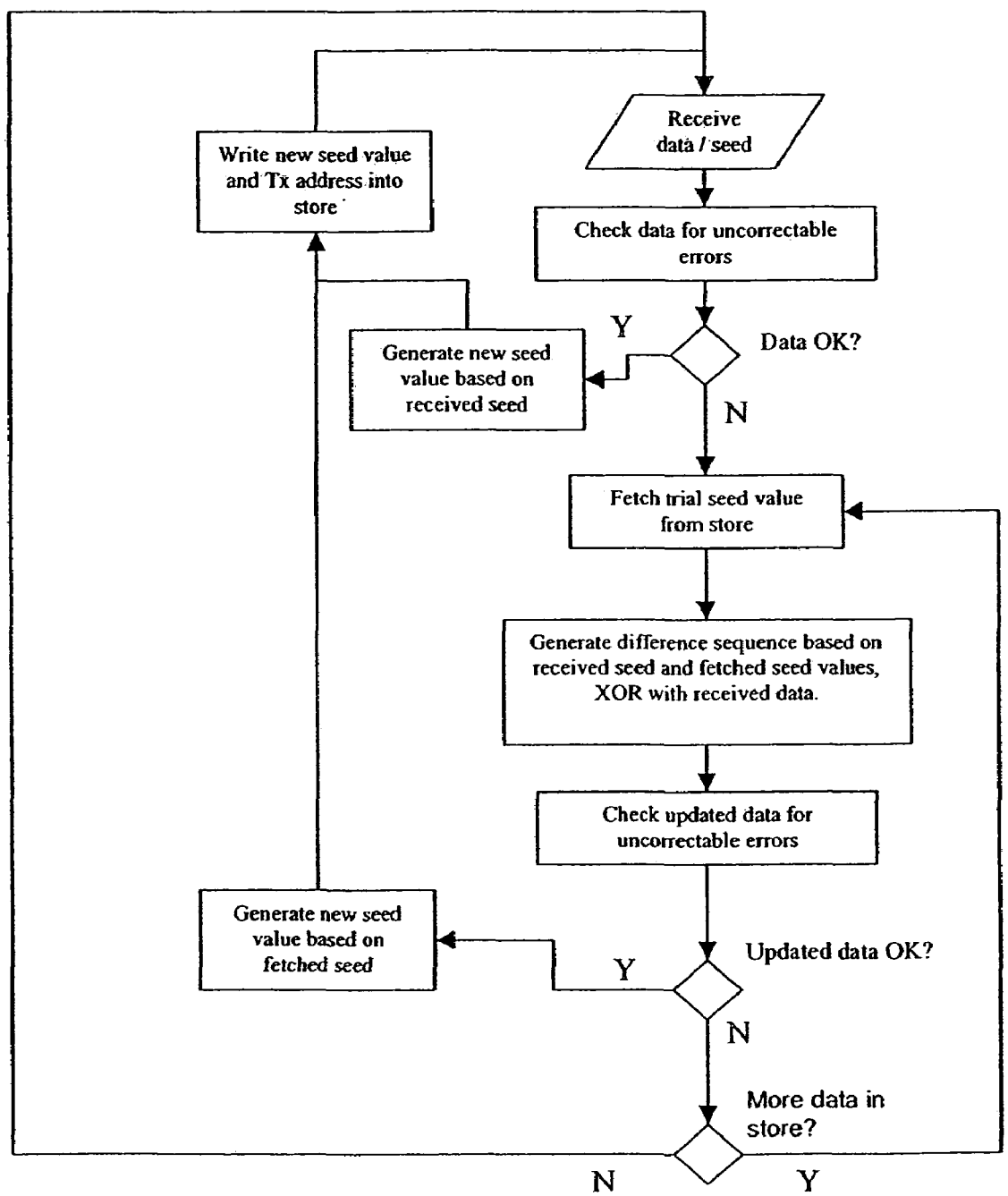
FIG. 9 shows a schematic flow diagram of a method in a communications system according to the invention.

Before transmitting a message from the transmitting device 1, stored state information e.g. receiving address/seed value pairs is checked to see whether a scrambler seed value associated with the destination receiving device 2 exists. If such state information exists, this seed value is used to initialize the scrambler seed value in the PHY layer of the transmitting address for the coming transmission. If no entry exists, any PHY-layer compliant value may be used. At the receiving device 2, the message is received on Rx data, and Rx seed is set to the value of the scrambler seed value deduced within the PHY-layer of the receiving device 2. The algorithm performed within the Rx MAC of the receiving device 2 then proceeds according to the flow diagram in FIG. 9.

The first step at the receiving device 2, as before, is to check the received data or message for uncorrectable errors. If there were no errors, or the errors could be corrected, the received seed value can be treated as correct. The MAC header of the received message contains both the address of the transmitting device 1 and the address of the receiving device 2 to which the message is intended. If the message is intended for one of the receiving addresses associated with the MAC layer of the receiving device 2, and was sent using FEC, a new seed value can be generated by the local seed generator in the receiving device 2, and the new seed value is written into a store for state information where it is associated with the transmitting address and receiving address. If the message is not intended to be received by the MAC layer of the receiving device 2, it may be discarded with no further action.

If there was an error, a descrambling error is assumed and an attempt is made to retrieve a previously stored descrambler seed value which allows the data to be correctly received. If such a seed value is retrieved, then this seed value can be treated as correct and the transmitting and receiving addresses can be read from the MAC header in the message. If the message is not intended for one of the receiving addresses associated with the MAC-layer of this receiving device 2, the message can be discarded and no further action taken. If the message was sent using FEC and was intended for the MAC layer of the receiving device 2, a new seed value is generated by the local seed generator and the address of the transmitting device 1 and the receiving address is used to write the new seed value into the store for state information at the receiving device 2. By associating the locally stored seed values with these addresses, it is possible to maintain synchronization with multiple transmitting devices 1 and multiple receiving addresses implemented by the MAC layer of each receiving device 2 (e.g. addresses for unicast and broadcast traffic).

If all seed values in the store for state information at the receiving device 2 are exhausted, or it is necessary to terminate the search for another reason (e.g. insufficient time) the message cannot be received, and is discarded.

Where an exhaustive search of the store of seed values is performed, this method has the same probability of packet error as for the case where only a single transmitter and receiver are considered. However, in practical systems an exhaustive search may not be possible due to constraints in either time or the amount of processing resources that can be dedicated to the search. The processing effort can be minimized by attempting to correct errors in the MAC header first, and discarding any message whose receive address does not match an address for this receiver. A more intelligent search strategy can also be formulated, by using knowledge of the system, information contained in the MAC layer and by trying stored seed values that have the lowest non-zero bitwise difference (Hamming distance) to the received seed value first.

Two such search strategies will be considered here, one for the access point in the WLAN cell, and one for a mobile terminal.

In a conventional 802.11 WLAN cell, scheduling of transmissions is primarily performed by listening before transmitting and using a random backoff at each terminal. This means that the access point (AP) must be capable of receiving transmissions from any of the mobile terminals that are registered (associated) with it in the cell. In the 802.11e draft standard, apart from introducing MAC level error correction, a more advanced centrally controlled scheduling mechanism is defined where an opportunity to transmit (a so-called TXOP) is granted by the AP for a proportion of all traffic. This centrally scheduled traffic is possibly the most interesting for audio and video transmission, which is the application for which MAC level FEC is aimed.

During a TXOP, the AP knows that any received transmissions destined for it (uplinks) will come from the mobile terminal which has been granted the TXOP, and therefore can retrieve the appropriate seed value associated with the known transmitter address. For random-access (contention based) traffic, the AP does not have any knowledge of the transmitter and must perform a search based on the seed value, unless the AP is engaged in a frame exchange sequence which identifies the transmitter (such as when a "request to send"/"clear to send" exchange has occurred).

An additional aid when operating according to the 802.11e draft standard is that it is not always necessary to send an acknowledgement frame (particularly common for audio/video streams with FEC), and one can arrange to delay acknowledgement in other cases. This means that the timing constraints on the search are defined by the allowable jitter in the delivery rate of messages, rather than the short acknowledgement time period defined in base 802.11.

The task of identifying the correct seed value is significantly easier for a mobile terminal, since most traffic received comes from the access point (a downlink): in the base 802.11 standard, all traffic sent to mobile terminals in a BSS cell comes from the access point.

The 802.11e draft standard introduces the possibility of direct communication between mobile terminals (so-called sidelinks). This means that the receiver at the mobile terminal must consider the possibility of a transmitter address other than the AP. However, the number of sidelinks is likely to be much lower than the total number of stations in the BSS, and most sidelinks using FEC will be transmitted in the context of an AP-scheduled TXOP, allowing the receiving mobile terminal to identify the transmitter address in advance.

When a message is received outside of an AP-scheduled TXOP, an intelligent search strategy would be to either try the seed value associated with the AP transmit address first, or to apply some form of weighting according to the proportion of FEC traffic received on the various links.

The proposed method is applicable to any wireless data communication system where forward error control is applied prior to scrambling by a transmitting device, where a transmission error in the scrambling seed value causes the descrambler in a receiving device 2 to corrupt the transmitted message and overload the error correction capability of the forward error control system.

The invention claimed is:

1. A method for limiting error propagation due to scrambler seed value transmission errors in a wireless communication network comprising at least one transmitting device (1) and at least one receiving device (2), wherein each transmitting device (1) has an associated transmitting address and each receiving device (2) has at least one associated receiving address, wherein each transmitting device (1) applies a forward error correction code to transmitted messages followed by scrambling of the message, and the scrambling is generated from a seed value, and each transmitted message is structured in such a manner that said seed value can be inferred at a receiving device (2) in the case of an error-free received message, the method comprising the steps of: providing state information at the transmitting device (1) for each message transmitted from said transmitting device (1) in such a manner that the transmitting device (1) can generate a sequence of seed values associated with each receiving address, providing state information at the receiving device (2) for each received message in such a manner that the receiving device (2) can generate sequences of seed values, each sequence associated with a unique combination of a transmitting address and a receiving address, the transmitting device (1) attempting to retrieve state information regarding a receiving address associated with the receiving device (2), if no state information is retrievable by said transmitting device (1) such state information is generated by an arbitrary method in order to generate a new seed value for a message to be transmitted, if state information is retrievable by said transmitting device (1), this information is utilized to initialize a first seed-generating algorithm in order to generate a new seed value for the message to be transmitted, and is updated by said algorithm, applying a scrambling algorithm initialized by the new seed value to said message to be transmitted, thereby creating a scrambled message, transmitting the scrambled message from said transmitting device (1), receiving and descrambling the scrambled message at said receiving device (2), based on the seed value deduced from the received message, checking the received descrambled message for errors that are not corrected by the forward error correction code, using received messages that are free from errors to synchronize a second seed-generating algorithm in said receiving device (2) with said first seed-generating algorithm in said transmitting device (1), using a current local seed value in said receiving device (2) to attempt to correct errors in the descrambled message caused by an incorrect received seed.

2. A method according to claim (1), wherein said receiving device (2) performing a search of some or all of the current local seed values of each seed sequence at the receiving device (2) and using each such seed value from the search in an attempt to correctly receive the message.

3. A method according to claim (1), wherein using said current local seed value in said receiving device (2) to synchronize said, second seed-generating algorithm in the receiving device (2) with said first seed-generating algorithm in said transmitting device (1), if the message is free from errors following the attempt to correct errors in the descrambled message caused by an incorrect received seed.

4. A method according to claim (1), wherein said first seed-generating algorithm at the transmitting device (1) generating the same sequence of seed value as said second seed-generating algorithm at the receiving device (2), when correctly synchronized.

5. A method according to claim (1), further comprising the step of determining the next seed value in said sequence of seed values at the transmitting device (1) from at least the current seed value.

6. A method according to claim (1), further comprising the step of causing said first seed-generating algorithm at said transmitting device (1) to move to the next seed value in said sequence of seed values at the transmitting device (1) and update the state information for said receiving address for each transmitted message.

7. A method according to claim (1), further comprising the step of causing said second seed-generating algorithm at said receiving device (2) to move to the next seed value in said sequence of seed values at the receiving device (2) and update the state information for said transmitting and receiving addresses for each correctly received message.

8. A method for limiting error propagation due to scrambler seed value transmission errors in a wireless communication network the method comprising the steps of: providing state information at a transmitting device for each message transmitted from said transmitting device, providing state information at a receiving device for each received message, attempting to retrieve state information by the transmitting device regarding a receiving address associated with the receiving device, if no state information is retrievable by said transmitting device such state information is generated by an arbitrary method in order to generate a new seed value for a message to be transmitted, if state information is retrievable by said transmitting device, this information is utilized to initialize a first seed-generating algorithm in order to generate a new seed value for the message to be transmitted, and is updated by said algorithm, applying a scrambling algorithm initialized by the new seed value to said message to be transmitted, thereby creating a scrambled message, transmitting the scrambled message from said transmitting device, receiving and descrambling the scrambled message at said receiving device, based on the seed value deduced from the received message, checking the received descrambled message for errors that are not corrected by a forward error correction code.

9. A method according to claim 8, further comprising the steps of using received messages that are free from errors to synchronize a second seed-generating algorithm in said receiving device with said first seed-generating algorithm in said transmitting device, using a current local seed value in said receiving device to attempt to correct errors in the descrambled message caused by an incorrect received seed.

10. A method according to claim 9, wherein said receiving device performing a search of some or all of the current local seed values of each seed sequence at the receiving device and using each such seed value from the search in an attempt to correctly receive the message.

11. A method according to claim 9, wherein using said current local seed value in said receiving device to synchronize said second seed-generating algorithm in the receiving device with said first seed-generating algorithm in said transmitting device, if the message is free from errors following the attempt to correct errors in the descrambled message caused by an incorrect received seed.

12. A method according to claim 9, wherein said first seed-generating algorithm at the transmitting device generating the same sequence of seed value as said second seed-generating algorithm at the receiving device, when correctly synchronized.

13. A method according to claim 9, further comprising the step of determining the next seed value in said sequence of seed values at the transmitting device (1) from at least the current seed value.

14. A method according to claim 9, further comprising the step of causing said first seed-generating algorithm at said transmitting device (1) to move to the next seed value in said sequence of seed values at the transmitting device (1) and update the state information for said receiving address for each transmitted message.

15. A method according to claim 9, further comprising the step of causing said second seed-generating algorithm at said receiving device (2) to move to the next seed value in said sequence of seed values at the receiving device (2) and update the state information for said transmitting and receiving addresses for each correctly received message.

* * * * *